United States Patent [19]

Zannucci et al.

[11] 4,338,247
[45] Jul. 6, 1982

[54] POLYESTER COMPOSITIONS HAVING IMPROVED RESISTANCE TO RADIATION DETERIORATION

[75] Inventors: Joseph S. Zannucci; Bobby J. Sublett, both of Kingsport, Tenn.

[73] Assignee: Eastman Kodak Company, Rochester, N.Y.

[21] Appl. No.: 155,047

[22] Filed: Jun. 2, 1980

[51] Int. Cl.³ .................. C08K 9/00; C08G 63/76
[52] U.S. Cl. ................................ 528/307; 525/437; 525/444; 525/445; 528/176; 528/192; 528/272; 528/293; 528/295; 528/300; 528/304; 528/309; 528/298; 528/220; 528/209
[58] Field of Search ............... 528/272, 293, 295, 300, 528/304, 309, 176, 192; 525/437, 444, 445; 260/45.85

[56] References Cited

U.S. PATENT DOCUMENTS

| | | | |
|---|---|---|---|
| 3,706,701 | 12/1972 | Susi | 260/45.85 |
| 3,779,993 | 12/1973 | Kibler et al. | 528/304 X |
| 3,873,505 | 3/1975 | Laakso et al. | 528/304 |
| 4,256,860 | 3/1981 | Davis et al. | 525/437 |
| 4,256,861 | 3/1981 | Davis et al. | 525/437 |

*Primary Examiner*—Lucille M. Phynes

*Attorney, Agent, or Firm*—Donald W. Spurrell; Daniel B. Reece, III

[57] ABSTRACT

Disclosed are highly stable copolyesters having inherent viscosities of at least 0.4 and containing in copolymerized form from about 0.3 to about 5.0% by weight of one or more of the stabilizing moieties having the general formula

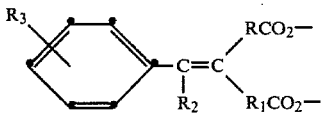

where R and $R_1$ are each a chemical bond or an alkylene group of 1-6 carbons; $R_2$ is alkyl, cycloalkyl, or aryl; $R_3$ represents 1-5 groups each independently selected from H, Cl, F, alkyl, cycloalkyl, alkoxy, aryl or aryloxy; wherein all of the above alkyl and alkylene moieties comprising or being part of the $R_2$ or $R_3$ groups contain from 1-8 carbons; and wherein all of the above alkyl, alkylene, aryl and cycloalkyl moieties may be substituted with up to three substituents selected from halogen, alkyl of 1-8 carbons, alkoxy of 1-8 carbons, aryl, cycloalkyl and CN.

4 Claims, No Drawings

POLYESTER COMPOSITIONS HAVING IMPROVED RESISTANCE TO RADIATION DETERIORATION

This invention concerns copolyester compositions having built-in stabilizers and useful, for example, as films, fibers, sheeting and the like to be employed in environments of prolonged exposure to radiation such as sunlight.

It is typical of polyester materials that on exposure to sunlight for extended periods of time the polymer backbone degrades and the desirable physical properties such as tensile and flexural strength important to their utility as structural molding plastics and the like are lost. Many additives and stabilizers have been developed which improve the weatherability of polyester compositions, but none have been found to adequately assist weatherability under severe and prolonged exposure to sunlight and other conditions such as processing by extrusion and the like during which the stabilizers are often lost by, e.g., degradation or bleeding.

Perhaps some of the more effective stabilizers which have been proposed are the dimethyl and diethyl esters of p-methoxybenzylidenemalonic acid which are used in admixture with polymeric materials as disclosed in U.S. Pat. No. 3,706,701. Such stabilizers have been employed with a number of types of polyesters but do not impart the extraordinary weatherability required for use in certain extended outdoor exposure applications, even at stabilizer loadings as high as 2% by weight of the polyester.

In accordance with the present invention it has been discovered that polyesters containing certain copolymerized stabilizer moieties somewhat similar in structure to those of the aforesaid patent, as either monofunctional terminal ester forming groups or as difunctional comonomers are very weatherable and are useful formulations for prolonged outdoor exposure. These polyesters can be used for the production of weatherable fibers, films, oriented films, sheeting, molded articles and the like.

The copolymerizable moieties have the general formula

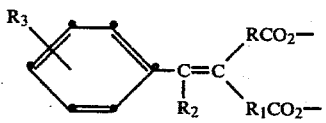

where R and $R_1$ are each a chemical bond or an alkylene group of 1-6 carbons; $R_2$ is alkyl, cycloalkyl, or aryl; $R_3$ represents 1-5 groups each independently selected from H, Cl, F, alkyl, cycloalkyl, alkoxy, aryl or aryloxy; wherein all of the above alkyl and alkylene moieties comprising or being part of the $R_2$ or $R_3$ group contain from 1-8 carbons, and wherein all of the alkyl, alkylene, aryl and cycloalkyl moieties throughout this specification may be substituted with up to three substituents which do not interfere with the copolymerization or adversely effect the chemical or physical properties of the polyester, including substituents such as halogen, alkyl of 1-8 carbons, alkoxy of 1-8 carbons, aryl, cycloalkyl, CN, and the like. A highly effective stabilizing moiety has the structure

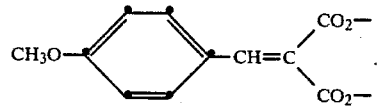

The polyesters into which the present stabilizer moieties are incorporated are prepared by reaction conditions well known in the art. These polyesters may be homopolyesters or copolyesters prepared by reacting a dibasic acid (or ester) or mixtures thereof with aliphatic glycols or glycol mixtures as disclosed, for example, in U.S. Pat. No. 3,779,993 at Column 3. Such dibasic acids are, for example: terephthalic, isophthalic, p,p'-sulfonyldibenzoic, 1,2- or 1,3- or 1,4-cyclohexanedicarboxylic, 1,4- or 1,5- or 2,7- or 2,6-naphthalenedicarboxylic, 4,4'-diphenic, 4,4'-benzophenonedicarboxylic, and the like. The glycols are, for example, polymethylene glycols containing 2 to 10 carbon atoms such as ethylene glycol, 1,2- or 1,3-propanediol, 1,2- or 1,3- or 1,4-cyclohexanedimethanol, neopentyl glycol, 1,5- or 2,4-pentanediol, 1,6- or 2,5-hexanediol, 1,3- or 2,3- or 1,4-butanediol, 2,2,4,4-tetramethylcyclobutane-1,3-diol and the like. Also, modifying amounts, i.e., up to about 40 mole % of various acids such as p-hydroxybenzoic adipic, and sebacic, and ether glycols such as diethylene glycol, poly(ethylene glycol), poly(propylene glycol), and poly(butylene glycol) may be added. Such polyesters may be amorphous or crystalline, they must be able to be formed into films, sheets, or molded objects, preferably have an ASTM (D648-56) 264 psi heat deflection temperature of >60° C., and have an inherent viscosity of at least about 0.4 and preferably between about 0.4 and about 1.6 when measured at 25° C. using 0.5 grams of polymer per 100 milliliter of a solvent consisting of 60 volumes of phenol and 40 volumes of tetrachloroethane. Preferred such polyester moldable compositions are, for example, predominantly poly(ethylene terephthalate), poly(tetramethylene terephthalate), poly(1,4-cyclohexylenedimethylene terephthalate, and the like.

A typical copolyester preparation in which the stabilizer is copolymerized into the polymer chain is carried out as follows: ninety four and seventy nine hundreths grams (0.4886 moles) of dimethyl terephthalate, 87.0 grams (1.4 moles) of ethylene glycol, 10.49 g (0.0729 moles) of 1,4-cyclohexanedimethanol, 1.1 g (0.0044 moles) of dimethyl-p-methoxybenzylidenemalonate, 1 ml of n-butanol solution of titanium tetraisopropoxide which is 0.75% titanium, and 1 ml of an ethylene glycol solution containing 1.1% by weight of commercial Zonyl A, were weighed into a 500 ml single-neck round-bottom flask equipped with a nitrogen inlet, a stirrer, a vacuum outlet and a condensing flask. The flask was heated at 200° C. in a metal bath for 3 hrs. with a nitrogen sweep over the reaction mixture. When the theoretical amount of methanol had distilled from the reaction mixture the metal bath temperature was increased to 280° C. and the pressure in the flask reduced to 0.5 mm of Hg for 1 hr. and 15 minutes. The flask was then removed from the metal bath and allowed to cool to room temperature under reduced pressure. The inherent viscosity of this polymer was about 0.76.

The following Table 1 shows the effects of several commercial stabilizers on the weatherability of polyester material. Table 2 shows the large improvements in weatherability obtained by the present invention over most of the commercial stabilizers. In the tables, the flatwise impact strengths we obtained are according to ASTM D256 Method A.

TABLE 1

Photostability[1] of Poly(65/35 molar-1,4-cyclohexylenedimethylene/ethylene terephthalate) Formulations Containing the Following Selected Commercial Stabilizers Numbered 1-10

1. 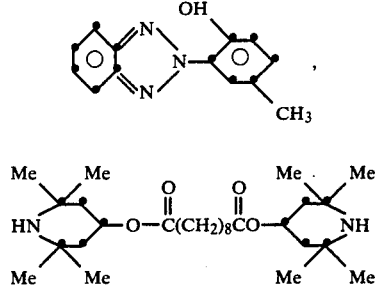

2. 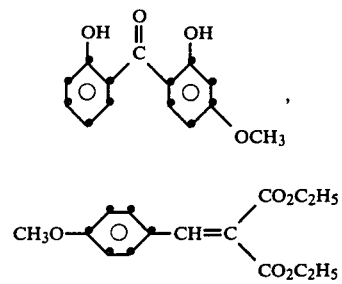

3. 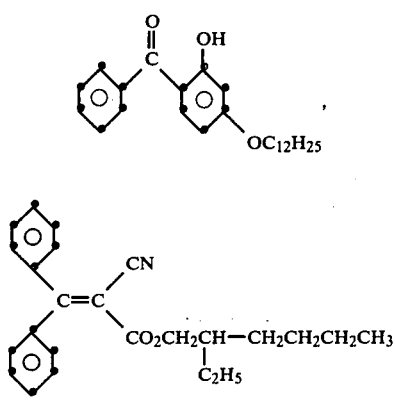

4. 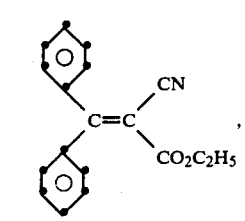

5. 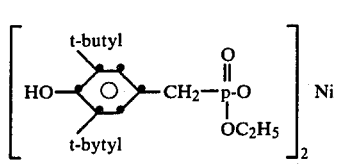

6.

7.

8.

9. 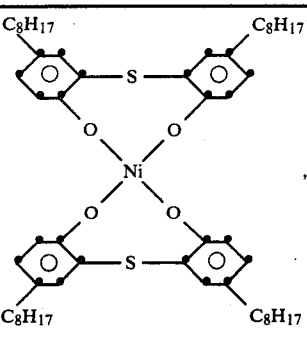

10. 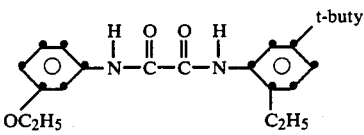

| Stabilizer | Flatwise Impact Strength Hours Exposed | |
|---|---|---|
| (1% w/w) | 0 | 500 |
| 1 | 16 | 4 |
| 2 | 16 | 1 |
| 3 | 16 | 2 |
| 4 | 16 | 5 |
| 5 | 16 | 1 |
| 6 | 16 | 1 |
| 7 | 16 | 1 |
| 8 | 16 | 1 |
| 9 | 16 | 1 |
| 10 | 16 | 4 |
| Control (No Stabilizer) | 16 | <1 |

[1]Samples weathered in the Atlas XWR Weather-Ometer.

TABLE 2

Photostability[1] of Polyester-Stabilizer Copolymers vs. Polyester-Stabilizer Mixtures

| Composition[2] | Flatwise Impact Strength Hours Exposed | | | | |
|---|---|---|---|---|---|
| | 0 | 500 | 1000 | 2000 | 2500 |
| Polymer A + 1% Stabilizer[3] | 18 | 7 | 3 | 4 | |
| Polymer A + 2% Stabilizer[3] | 17 | 7 | 6 | 6 | |
| Copolymer A containing 0.25% pendant p-methoxybenzylidene malonate group | 17 | 11 | 4 | | |
| Copolymer A containing 0.5% pendant p-methoxybenzylidene malonate groups | 18 | 16 | 12 | | |
| Copolymer A containing 2.0% pendant p-methoxybenzylidene malonate groups | 17 | 19 | 17 | 18 | 14 |
| Polymer B + 1% Stabilizer[4] | 16 | 5 | 5 | 4 | 2 |
| Copolymer B containing 0.25% pendant p-methoxybenzylidene malonate groups | 18 | 3 | 4 | | |
| Copolymer B containing 0.5% pendant p-methoxybenzylidene malonate groups | 18 | 18 | 7 | | |
| Copolymer B containing 1.0% pendant p-methoxybenzylidene malonate group | 18 | 17 | 19 | | |

[1]Sample weathered in the Atlas XWR Weather-Ometer.
[2]Polymer A = poly(69/31 molar ethylene/1,4-cyclohexylenedimethylene terephthalate) Polymer B = poly(65/35 molar 1,4-cyclohexylenedimethylene/ethylene terephthalate)
[3]Dimethyl p-methoxybenzylidene malonate
[4]Diethyl p-methoxybenzylidene malonate.

The following table gives further specific examples of stabilizing moieties useful in the present invention.

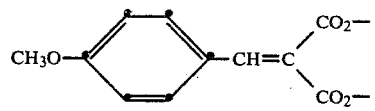

| R | $R_1$ | $R_2$ | $R_3$ |
|---|---|---|---|
| H | H | —CH$_3$ | 2-Cl |
| —CH$_2$— | —CH$_2$— | H | 3-OCH$_3$ |
| —CH$_2$— | —CH$_2$— | —C$_6$H$_{11}$ | H |
| —CH$_2$CH$_2$CH$_2$— | —CH$_2$CH$_2$— | —C$_6$H$_5$ | H |
| —CH$_2$CH$_2$— | H | H | 2,6-di-CH$_3$ |
| H | H | H | 2-OC$_6$H$_5$ |
| H | H | H | H |
| H | H | —CH$_3$ | H |
| H | H | —CH$_3$ | H |
| H | H | —CH$_2$CH$_2$Cl | 2-CH$_2$OC$_2$H$_5$ |
| H | H | —CH$_2$CH$_2$Cl | 3-C$_2$H$_4$CN |

The invention has been described in detail with particular reference to preferred embodiments thereof, but it will be understood that variations and modifications can be effected within the spirit and scope of the invention.

We claim:

1. A copolyester having an inherent viscosity of at least 0.4 and containing in copolymerized form from about 0.3 to about 5.0% by weight of one or more of the stabilizing moieties having the general formula

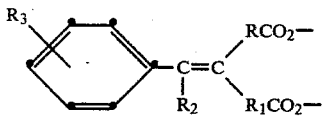

where R and $R_1$ are each a chemical bond or an alkylene group of 1–6 carbons; $R_2$ is alkyl, cycloalkyl, or aryl; $R_3$ represents 1–5 groups each independently selected from H, Cl, F, alkyl, cycloalkyl, alkoxy, aryl or aryloxy; wherein all of the above alkyl and alkylene moieties comprising or being part of the $R_2$ or $R_3$ groups contain from 1–8 carbons, and wherein all of the above alkyl, alkylene, aryl and cycloalkyl moieties may be substituted with up to three substituents selected from halogen, alkyl of 1–8 carbons, alkoxy of 1–8 carbons, aryl, cycloalkyl and CN.

2. The copolyester according to claim 1 wherein the stabilizing moiety has the structure $$CH_3O-\text{C}_6H_4-CH=C(CO_2-)(CO_2-)$$

3. The copolyester according to claim 2 wherein the dibasic acid is selected from one or both of terephthalic and 1,2-, 1,3- or 1,4-cyclohexanedicarboxylic, and may include up to about 40 mole % of a modifying acid selected from adipic, sebacic, p,p'-sulfonyldibenzoic, p-hydroxybenzoic, 1,4-, 1,5-, 2,7- or 2,6-naphthalenedicarboxylic, 4,4'-diphenic or 4,4'-benzophenonedicarboxylic and the glycols are selected from one or more of ethylene glycol, 1,2- or 1,3-propanediol, 1,2- or 1,3- or 1,4-cyclohexanedimethanol, neopentyl glycol, 1,5- or 2,4-pentanediol, 1,6- or 2,5-hexanediol, 1,3-, 2,3- or 1,4-butanediol and 2,2,4,4-tetramethylcyclobutane-1,3-diol and may contain up to about 40 mole % of one or more of diethylene glycol, poly(ethylene glycol), poly(propylene glycol), and poly(butylene glycol).

4. The copolyester of claim 3 wherein the principal polyester comprises in a molar ratio of from about 4/1 to about 1/4, ethylene/1,4-cyclohexylenedimethylene terephthalate.

* * * * *